US006841656B2

(12) United States Patent
Christel et al.

(10) Patent No.: US 6,841,656 B2
(45) Date of Patent: Jan. 11, 2005

(54) METHOD OF PROCESSING A POLYCONDENSATE IN A MULTI-SCREW EXTRUDER

(75) Inventors: Andreas Christel, Zuzwil (CH); Jürgen Schweikle, Niederhelfenschwil (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 10/427,975

(22) Filed: May 2, 2003

(65) Prior Publication Data

US 2004/0006195 A1 Jan. 8, 2004

(30) Foreign Application Priority Data

Nov. 2, 2000 (DE) .......................................... 100 54 226

(51) Int. Cl.$^7$ .................................................. C08F 6/00
(52) U.S. Cl. ........................ 528/492; 264/176; 264/219; 528/480; 528/481
(58) Field of Search .............................. 264/176.1, 219; 528/480, 481, 492

(56) References Cited

U.S. PATENT DOCUMENTS

| 5,242,993 | A | 9/1993 | Hergenrother et al. |
| 5,334,669 | A | 8/1994 | Ghisolfi |

FOREIGN PATENT DOCUMENTS

| EP | 0 336 520 A1 | 10/1989 |
| JP | 5-42533 | 2/1993 |
| WO | WO00/32377 | 6/2000 |

*Primary Examiner*—Terressa Boykin
(74) *Attorney, Agent, or Firm*—Burns, Doane, Swecker & Mathis, L.L.P.

(57) ABSTRACT

A method for processing a polycondensate to give a granulate formed as pellets is disclosed, whereby the polycondensate is fused in the course of the method and then later resolidified. In an exemplary method, a total time during which the temperature of the polycondensate is above the melting point thereof is less than about 60 seconds. This method can be carried out by a multi-shaft extruder, whereby the degrassing and/or drying of the polycondensate in the solid state occurs at a pressure below atmospheric pressure and/or with addition of an inert gas. The time period, during which the polycondensate remains in the extruder, after being melted therein, amounts to, for example, less than about 15 seconds.

21 Claims, 1 Drawing Sheet

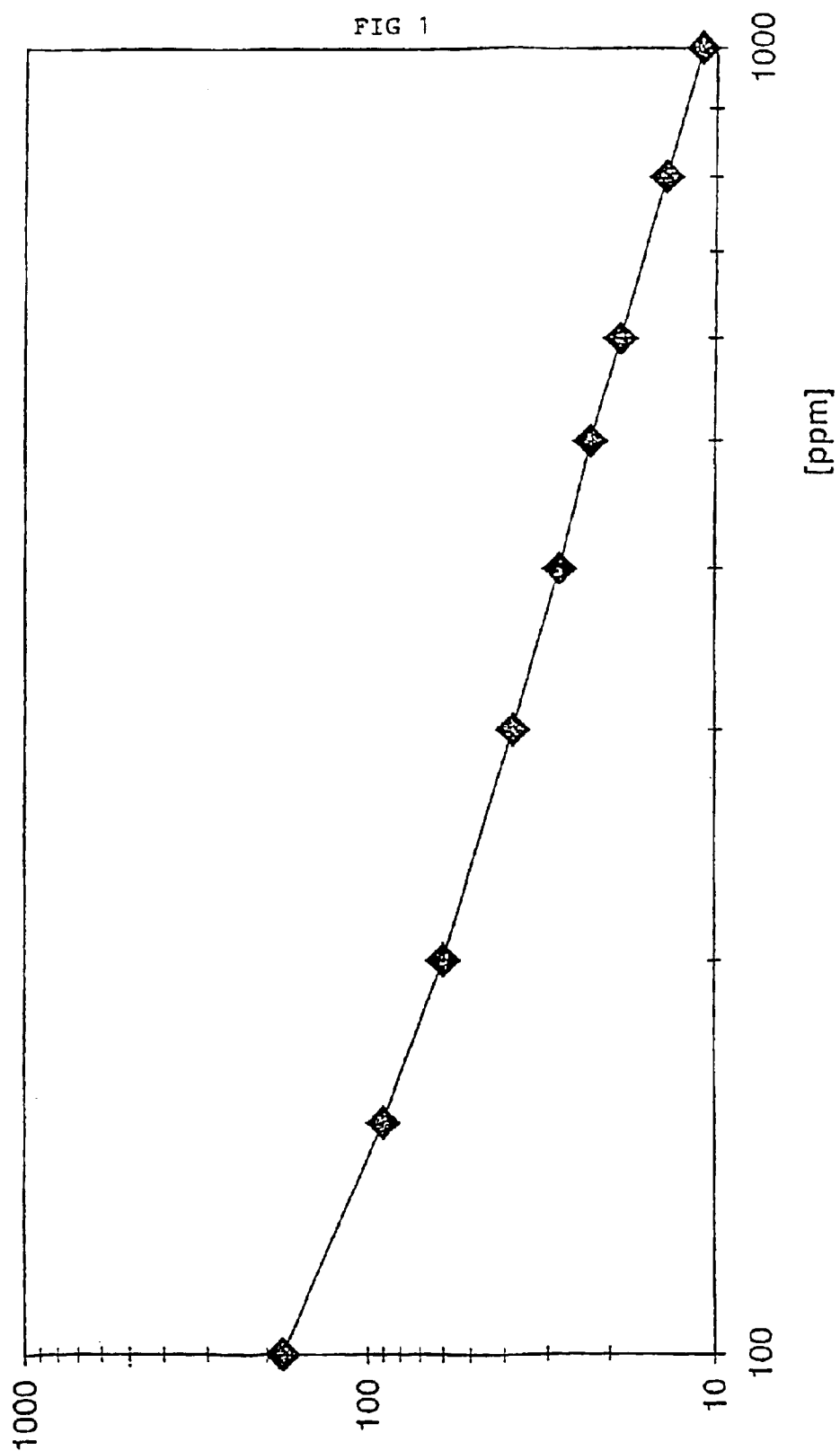

METHOD OF PROCESSING A POLYCONDENSATE IN A MULTI-SCREW EXTRUDER

This application claims priority under 35 U.S.C. §119 to German Application 100 542 26.3 filed in Germany on 2, Nov. 2000, and under 35 U.S.C. §120 to PCT/CH01/00429 filed as an International Application on 9 Jul. 2001 designating the U.S., the entire contents of which are hereby incorporated by reference in their entireties.

BACKGROUND

This invention relates to a method of processing a polycondensate, in particular polyethylene terephthalate (PET), to yield granules formed as pellets, the polycondensate being melted in the course of the process and later solidified again.

Such methods, in particular for processing PET, are known. The PET starting material originates directly from PET synthesis, or recycled PET bottles (RPET) are used, in which case the RPET fraction coming from the bottle wall is preferred, so that one is working mainly with chips and/or flakes. These chips always contain, in addition to other unwanted impurities, small amounts of water, which may be residual water from the bottle washing process that has not been expelled and/or water that has entered during storage and shipping of the chips. If these chips of RPET or new PET having a water content are melted in an extruder to produce granules, the condensation reaction proceeds mainly in the opposite direction (establishing an equilibrium), and hydrolysis is predominant, so that there is a reduction in the average chain length, i.e., the degree of polymerization, so the viscosity (given as the viscosity index or the intrinsic viscosity IV) of the polymer also declines. This hydrolytic degradation is more pronounced, the greater the amount of water and time available for the degradation reaction.

Previous efforts in the state of the art have been aimed at reducing the water content. The goal in the usual predrying is to achieve a low water content of less than 100 ppm (typically approximately 30 ppm) to prevent an excessive reduction in the IV in the subsequent melting of the PET and/or RPET during the usual dwell times in the molten state, where the polycondensation equilibrium achieves significant reaction rates (above approx. 180–190° C. for PET). A reduction in IV by approx. 0.05 from approx. 0.80 to approx. 0.75 would be acceptable. This extensive predrying takes a relatively great amount of time and energy and retards the processing when continuous operation with integrated predrying is the goal.

SUMMARY

An object of this invention is to improve upon the state-of-the-art method such that there is no greater reduction in IV than in the state of the art while achieving only partial predrying.

An exemplary method achieves this by limiting the time during which the polycondensate to be processed is in the melt form and is at the melting point or higher to less than 60 seconds; then the polycondensate no longer has enough time to react primarily by hydrolysis because of its relatively high water content. Therefore, the time-consuming and energy-intensive predrying may be omitted at least in part, and despite the relatively high water content in the starting polycondensate, much less hydrolysis occurs in processing in the melt state. For example, the reduction in IV may also be kept at a low and acceptable level even with a relatively high water content of approx. 600 ppm, e.g., in the case of PET and RPET.

In an exemplary method according to the present invention, the total time during which the temperature of the polycondensate is above the melting point of the polycondensate in the course of the process is kept at less than approx. 30 seconds. Then it is possible to work with a residual water content of more than 200 ppm (w/w) in the melt without having to accept a reduction in IV of more than 0.05.

For many applications in which the granules produced according to this invention are processed further by injection molding and blow molding to form containers such as beverage bottles, preferably polyethylene terephthalate (PET) is used as the polycondensate/polyester.

In its starting form, the polycondensate may be in the form of a bulk material with a bulk density in the range of 200 kg/m$^3$ to 600 kg/m$^3$, in particular in the form of flakes or chips, typically from recycled bottles (RPET).

The polycondensate starting material is preferably partially predried before melting. This makes it possible to obtain an end product with a small reduction in IV by combining a less expensive partial drying with a short dwell time in the molten state.

In a special exemplary embodiment, the method has a degassing step for removing volatile impurities and/or decomposition products from the polycondensate.

A twin-screw or multi-screw extruder, in particular a ring extruder, can be used for melting the polycondensate. In the case of the ring extruder, the ratio between the surfaces on which the product to be processed is actively being treated and the volume of the product to be processed is especially great, so that at a given design length, a greater degassing output and a narrower dwell time spectrum are achieved, and finally a shorter total dwell time is possible in comparison with traditional twin-screw extruders.

The polycondensate can be introduced into the extruder in a solid form and then the polycondensate heated to a temperature below the melting point while it is degassed and/or dried. The degassing and/or drying of the polycondensate in a solid form are accomplished here at a pressure below atmospheric pressure and/or by adding an inert gas.

An exemplary method according to this invention can be characterized in particular in that the total time during which the polycondensate is in the form of a melt during the process is composed of a first time segment during which the polycondensate still dwells in the extruder after melting and a second time segment during which the polycondensate, while still molten, is being processed outside the extruder, whereas the first time segment amounts to less than 15 seconds. A dwell time of the melt in the extruder of less than approx. 10 seconds is especially advantageous.

Processing of the molten polycondensate outside the extruder can include the step of melt filtration to remove particles of impurities. To build up the required pressure, a melt pump can be used. To do so, the melt pump and the melt filter are integrated into the process so that a short dwell time according to this invention can be maintained.

BRIEF DESCRIPTION OF THE DRAWING

Additional advantages, features and possible applications of this invention are derived from the following description of preferred embodiments and on the basis of the figure, although these are not to be interpreted as restrictive.

FIG. 1 shows the dwell time of PET in a molten state allowed for a decline in IV from 0.81 to 0.76, plotted as a function of the residual water content of the PET melt.

DETAILED DESCRIPTION OF THE PREFERRED EMBODIMENTS

In all examples described herein, flakes or chips with an initial IV value of 0.81 and a 0.6% water content were subjected to a partial predrying and melting in a 30 mm ring extruder at 300 rpm. The melt was degassed and passed through a melt pump, a melt filter and an extrusion nozzle and then cooled immediately. The melt temperature was 285° C. in each case.

EXAMPLE 1

The method was carried out in such a way as to yield a dwell time of 19 seconds in the melt. The IV value of the granules was 0.76.

EXAMPLE 2

The method was carried out so as to yield a dwell time of 43 seconds in the melt, which was achieved through a heated tube between the melt filter and nozzle. The IV value of the granules was 0.69.

The residual water content can be calculated from the reaction kinetics after degassing the melt; for both experiments, this amounted to approx. 600 ppm. This also yields the maximum hydrolytic degradation with an (infinitely) long dwell time, which corresponds to a decline in IV to 0.52.

It is apparent from the experiments described above that the hydrolytic degradation of PET can be reduced to a great extent by a short dwell time, despite a high residual water content in the melt. It can be seen that an acceptable decline in IV of 0.05 is achieved even with only partial predrying at a correspondingly short dwell time of the PET in the melt state.

The diagram in FIG. 1 shows allowed dwell times at a melt temperature of 285° C. with partial predrying, which limits the decline in IV to the value of 0.05, which is acceptable for many applications. As mentioned above, in contrast with that, a predrying to a water content of less than 100 ppm is used in the state of the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of processing a polycondensate to yield granules formed as pellets, comprising:

melting the polycondensate in the process using a twin-screw extruder or a multi-screw extruder, wherein the total time during which the polycondensate is formed as a melt during the process has a first time section during which the polycondensate still dwells in the extruder after melting, and a second time section during which the polycondensate, still molten, is processed outside the extruder, the duration of the first time section amounting to less than approximately 10 seconds; and solidifying the melted polycondensate wherein a total time during which a temperature of the polycondensate is above a melting point of the polycondensate in the process amounts to less than approximately 60 seconds.

2. The method according to claim 1, wherein the total time during which the temperature of the polycondensate is above the melting point of the polycondensate during the process amounts to less than approximately 30 seconds.

3. The method according to claim 2, wherein the residual water content in the melted polycondensate is greater than 200 ppm.

4. The method according to claim 1, wherein the polycondensate is a polyester.

5. A method of processing a polycondensate to yield granules formed as pellets, comprising:

melting the polycondensate in the process; and solidifying the melted polycondensate wherein a total time during which a temperature of the polycondensate is above a melting point of the polycondensate in the process amounts to less than approximately 60 seconds, wherein the polycondensate in its starting form is present as a bulk material with a bulk density in a range of 200 kg/m$^3$ to 600 kg/m$^3$.

6. The method according to claim 1, wherein the polycondensate is formed as flakes or chips.

7. The method according to claim 1, wherein a starting material of the polycondensate is partially predried before the melting.

8. The method according to claim 1, comprising:

degassing the polycondensate for removing volatile impurities or decomposition products from the polycondensate.

9. The method according to claim 1, comprising:

introducing the polycondensate in a solid state into the extruder;

heating the polycondensate to a temperature below the melting point; and degassing or drying the polycondensate, wherein the degassing or drying of the polycondensate in the solid state is performed at a pressure below atmospheric pressure or by adding an inert gas.

10. The method according to claim 1, wherein processing of the molten polycondensate outside the extruder includes melt filtration.

11. The method according to claim 1, wherein processing of the molten polycondensate outside the extruder includes the use of a melt pump.

12. The method according to claim 1, wherein the polycondensate is a polyethylene terephthalate.

13. The method according to claim 1, comprising:

using a ring extruder for melting the polycondensate.

14. The method according to claim 3, wherein the polycondensate is a polyethylene.

15. The method according to claim 14, wherein the polycondensate in its starting form is present as a bulk material with a bulk density in a range of 200 kg/m$^3$ to 600 kg/m$^3$.

16. The method according to claim 15, wherein the polycondensate is formed as flakes or chips.

17. The method according to claim 16, wherein a starting material of the polycondensate is partially predried before the melting.

18. The method according to claim 17, comprising:

degassing the polycondensate for removing volatile impu rities or decomposition products from the polycondensate.

19. The method according to claim 17, comprising:

introducing the polycondensate in a solid state into the extruder;

heating the polycondensate to a temperature below the melting point; and degassing or drying the polycondensate, wherein the degassing or drying of the polycondensate in the solid state is performed at a pressure below atmospheric pressure or by adding an inert gas.

20. The method according to claim 19, wherein processing of the molten polycondensate outside the extruder includes melt filtration.

21. The method according to claim 12, wherein the polyethylene terephthalate is obtained from recycled bottles.

* * * * *